(12) United States Patent
Trouw et al.

(10) Patent No.: US 9,763,053 B2
(45) Date of Patent: *Sep. 12, 2017

(54) BEACON COMMUNICATION SYSTEM AND METHODS

(71) Applicant: Ength Degree, San Diego, CA (US)

(72) Inventors: Arie Trouw, San Diego, CA (US);
Daniel Wang, San Diego, CA (US)

(73) Assignee: Ength Degree, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,351

(22) Filed: May 23, 2016

(65) Prior Publication Data

US 2016/0269865 A1 Sep. 15, 2016

Related U.S. Application Data

(63) Continuation of application No. 14/626,882, filed on Feb. 19, 2015, now Pat. No. 9,374,666.

(60) Provisional application No. 61/941,972, filed on Feb. 19, 2014.

(51) Int. Cl.
*H04W 4/02* (2009.01)
*H04W 4/12* (2009.01)
*H04W 12/02* (2009.01)
*H04W 40/24* (2009.01)

(52) U.S. Cl.
CPC ........... *H04W 4/025* (2013.01); *H04W 4/021* (2013.01); *H04W 4/023* (2013.01); *H04W 4/12* (2013.01); *H04W 12/02* (2013.01); *H04W 40/244* (2013.01)

(58) Field of Classification Search
CPC ....... H04W 4/00; H04W 4/008; H04W 4/025; H04W 4/021; H04W 4/06
USPC ..................... 455/456.1, 456.2, 456.3, 456.5
See application file for complete search history.

(56) References Cited

U.S. PATENT DOCUMENTS

| | | | |
|---|---|---|---|
| 8,670,381 B1 * | 3/2014 | Houri | G08B 25/00 370/328 |
| 9,374,666 B1 * | 6/2016 | Trouw | H04W 4/025 |
| 2008/0004798 A1 * | 1/2008 | Troxler | A01K 15/023 702/187 |

(Continued)

*Primary Examiner* — Siu Lee
(74) *Attorney, Agent, or Firm* — Cooley

(57) ABSTRACT

A system and method for providing a communications link between an owner of a lost article and a person that finds the lost article. The method includes detecting at a communication device of the person that finds the lost article, a beaconing signal generated by an electronic beacon device when the communication device is in proximity of the communication device. The beaconing signal is associated with an owner of the electronic beacon device. The communication device may transmit, to a server, location information and identification information inherent within the beaconing signal. The server may return one or more communication options enabling a user of the communication device to contact the owner of the electronic beacon device. Such communication options may comprise, for example, voice communication, video communication or communication via text message. In one embodiment the communication options enable communication to occur while maintaining the anonymity of the owner.

19 Claims, 6 Drawing Sheets

(56) References Cited

U.S. PATENT DOCUMENTS

2012/0206296 A1* 8/2012 Wan ..................... A01K 11/008
                                                    342/357.31

* cited by examiner

BEACON COMMUNICATION SYSTEM AND METHODS

CROSS-REFERENCE TO RELATED APPLICATIONS

This application is a continuation of U.S. application Ser. No. 14/626,882, entitled BEACON COMMUNICATION SYSTEM AND METHODS, filed on Feb. 19, 2015, which claims priority to and the benefit of U.S. Provisional Patent Application No. 61/941,972, entitled "BEACON COMMUNICATION SYSTEM AND METHODS," filed Feb. 19, 2014, the disclosures of which are incorporated herein by reference in their entirety.

BACKGROUND

Some embodiments described herein relate generally to a system and methods for a beacon communication system that can be used to track lost or misplaced items, and provide a communications link between the finder of such items and its owner.

Relatives, pets, and other items of importance to individuals can become lost or misplaced. In some instances, such loss can be of negligible importance, such as, for example, the loss of a sweater, an umbrella, a pen, etc. In other instances, such loss can have appreciable detrimental impacts, such as, for example, the loss of a wallet, a credit card, a driver's license card, a passport, luggage, etc. In yet other instances, such loss can be of critical importance such as, for example, the loss of a pet, a child, an elderly relative with Alzheimer's disease, etc. Even the inability to quickly locate a desired item such as, for example, a car in a large parking lot, can become a time-consuming inconvenience. Current methods of providing for the safe return of for example, a lost dog, may include providing a dog tag with the owner's name and contact information. In some cases, a parent of a lost child, or an owner of a pet or other item may not desire to have his/her contact information provided to those who may find such lost items or persons.

Accordingly, a need exists for a system and methods for quick and accurate location of lost and/or misplaced people, pets, and other items of importance while maintaining the anonymity of the owner (or relative in the case of a person) of the item.

SUMMARY

In one aspect, disclosed is a system and method which may provide a communications link between a person associated with a lost pet, person or item of interest and a person who finds the subject when it becomes lost. A method includes detecting with a communication device such as, for example, a mobile phone, a beaconing signal generated by an electronic beacon device when the communication device is in proximity of the electronic beacon device. The electronic beacon device can be physically coupled to the item or to an article or object worn by a person. The beaconing signal is associated with an owner of the electronic beacon device. Information inherent within the beaconing signal (e.g., an ID of the electronic beacon device) may be provided by the communication device to a server. The server may return one or more communication options enabling a user of the communication device to contact the owner of the electronic beacon device. Such communication options may comprise, for example, voice communication, video communication or communication via text message. In one embodiment the communication options enable communication to occur while maintaining the anonymity of the owner.

In another aspect the disclosure relates to a method for beacon-based communication. The method includes detecting, at a communication device, a beaconing signal generated by an electronic beacon device when the electronic beacon device is in proximity of the communication device. The beaconing signal may be associated with an entity affiliated with the electronic beacon device. For example, the entity may be an owner of the electronic beacon device and the electronic device may be coupled to an article, living creature (e.g., a pet) or person of interest to the owner. The method includes transmitting, from the communication device, location information and identification information inherent within the beaconing signal. The method further includes receiving, at the communication device, one or more communication options or modes through which the entity may be contacted. In one embodiment the communication options do not identify the entity, thereby enabling the entity to remain anonymous to a user of the communication device. The communication device receives user input provided by the user of the communication device wherein the user input is in accordance with at least one of the communication options. The communications device may then transmit message information for the entity wherein the message information is based upon the user input.

The disclosure further relates to a communication device for facilitating beacon-based communication. The communication device includes a processor, a user interface and a communication interface in communication with the processor. A memory coupled to the processor includes instructions which, when executed by the processor, cause the processor to detect a beaconing signal generated by the electronic beacon device when the electronic beacon device is in proximity of the communication device. The beaconing signal will generally be associated with an entity affiliated with the electronic beacon device. The instructions further cause the processor to transmit location information and identification information inherent within the beaconing signal and to receive one or more communication options through which the entity may be contacted. The communication options will generally not identify the entity, thereby enabling the entity to remain anonymous to a user of the communication device. In addition, the instruction cause the processor to receive, through the user interface, user input provided by the user of the communication device wherein the user input is in accordance with the at least one of the of the one or more communication options. The processor is further configured to cause message information for the entity to be transmitted through the communications interface wherein the message information is based upon the user input.

The disclosure also pertains to a system for facilitating beacon-based communication. The system includes a processor, a network interface in communication with the processor, and a memory coupled to the processor. The memory includes an application module and status information relating to an electronic beacon device, wherein when executed by the processor the application module causes the processor to:

receive, from a communication device which has detected a beaconing signal transmitted by an electronic device in proximity of the communication device, location information and identification information inherent within the beaconing signal wherein the beaconing signal is associated with an entity affiliated with the electronic beacon device;

transmit, to the communication device, the status information relating to the electronic beacon device and one or more communication options through which the entity may be contacted;

receive, from the communication device, message information comporting with at least one of the one or more communication options wherein the message information is based upon user input provided by a user of the communication device; and send the message information to another communication device associated with the entity.

DETAILED DESCRIPTION

A system and method for providing a communication based on a beacon signal received by a mobile communication device is described herein. For example, an electronic device having a beacon mechanism can be physically coupled to an article or object worn by a person or pet, or can be physically coupled to an item of interest. The electronic device can provide a beacon signal to a communication device (e.g., a mobile phone) when the communication device is within a particular proximity to the electronic device. For example, the communication device can include a user application provided by an application server. The user application can provide communication information to application users such that the application user can contact an owner of the electronic device when a beacon signal is received by the communication device. The system can provide a method of contacting an owner of electronic device (e.g., beacon) that is associated with, for example, a lost pet or child, or a lost item or interest, such as, for example, a wallet, car keys, cell phone, etc. The contact information can be provided without revealing the identity of the owner.

As used in this specification, a user can be, for example, any person that is using a mobile communication device on which a user application is installed and is actively running that can detect the beaconing signals generated by the electronic device. Such user applications can also interface with the servers implementing a beacon communication system discussed herein. Moreover, used in this specification, a user may or may not be the owner of the mobile communication device.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "a communication device" is intended to mean a single communication device or a combination of communication devices.

Figure 1:
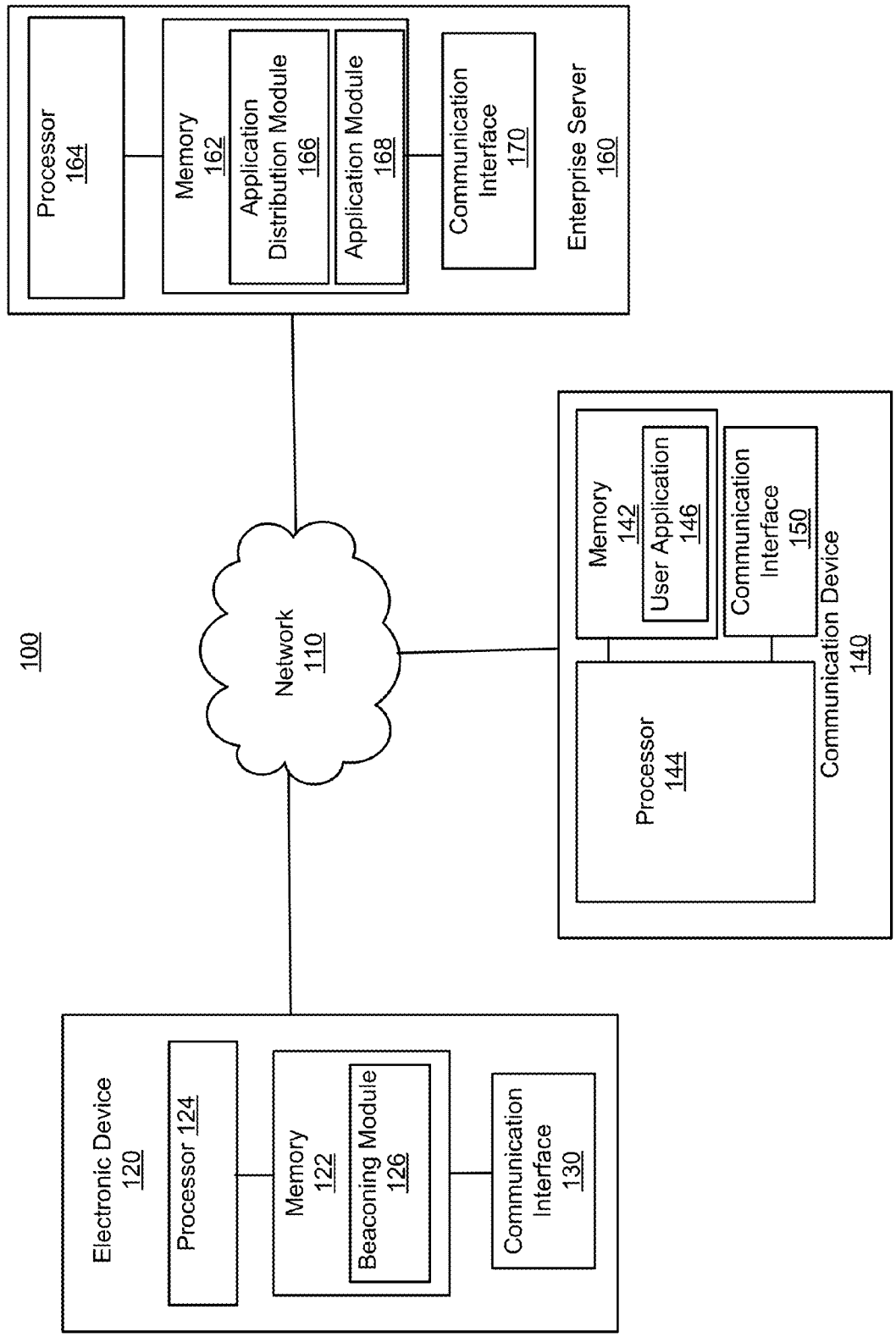
FIG. 1 is a schematic illustration of a beacon communication system, according to an embodiment.

FIG. 1 is a schematic illustration of a system, according to an embodiment. The system 100 shown in FIG. 1 includes a network 110, an electronic device 120, a (mobile) communication device 140 and an enterprise server 160. The network 110 can be any type of network (e.g., a local area network (LAN), a wide area network (WAN), a virtual network, and a telecommunications network) implemented as a wired network and/or a wireless network. As described in further detail herein, in some configurations, for example, the communication device 140 can be connected to the enterprise server 160 and/or the electronic device 120 via network 110 that can include an intranet, an Internet Service Provider (ISP) and the Internet, a cellular network (e.g., network 110), and/or the like.

The electronic device 120 (also referred to herein as a "beacon") can be an electronic device with wireless electronic beaconing capability that can be attached to an object or article, such as, for example, an object or article that can be worn by a person or pet, such as, for example, a bracelet or an identification tag for a pet (e.g., dog tag), or can be attached to an item, such as, for example, a wallet, a keychain, a watch, credit card etc. In some embodiments, the electronic device 120 can be fixedly coupled to the item of interest. In other embodiments, the electronic device 120 can be removably coupled to the item of interest. In yet other instances, the electronic device 120 can be permanently attached to a person or pet, such as, for example, as an attachment in subcutaneous implants that is imbedded inside the skin. The electronic device 120 can be powered by, for example, a battery, solar panels, and/or the like. The electronic device 120 can include a memory 122, a processor 124 and a communication interface 130.

The memory 122 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 122 can store instructions to cause the processor 124 to execute modules, processes and/or functions associated with the electronic device 120 and the beacon communication system 100. The processor 124 can be a general purpose processor, a Field Programmable Gate Array (FPGA), an Application Specific Integrated Circuit (ASIC), a Digital Signal Processor (DSP), and/or the like. The processor 124 can run and/or execute applications, modules, processes and/or functions associated with the electronic device 120 and/or the beacon communication system 100.

The memory 122 includes a beaconing module 126. The beaconing module 126 may be a software module executed by processor 124 or, alternatively, may be a hardware or firmware module. The beaconing module 126 can periodically or substantially periodically generate and/or define beaconing signals that include information associated with the geographical location of the electronic device 120, the current status of the electronic device 120 (e.g., lost, not lost), the original transmission strength of the beaconing signal, the protocol used for transmitting the beaconing signal (e.g., Wi-Fi®, Bluetooth®, 3G, 4G, 4G LTE), and/or the like. For example, in some instances, the beaconing signal can be generated and sent every 100 msec to 1 sec. In such instances, the beaconing signal can include identifiers that can identify the electronic device 120 such as, for example, a rotating cipher code, an internet protocol (IP) address, and/or the like. In other instances, the beaconing signal can also include identifiers that can identify the subject (e.g., a child, a dog, an elderly relative, etc.) of the electronic device. Such identifiers can include, for example, an owner login, an owner password, an owner identification number (PIN), biometric information (e.g., data associated with a fingerprint scan, a retinal scan, etc.) associated with the owner, and/or the like.

The electronic device 120 includes a communication interface 130, to provide communication with the communication device 140 and/or the enterprise server 160. The communication interface 130 can include one or multiple wireless port(s). The wireless port(s) in the communication interface 130 can send and/or receive data units (e.g., data packets) via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol), 4G long term evolution (4G LTE) protocol), and/or the like.

The communication device 140 can be any mobile communication device such as, for example, a laptop computer, a personal digital assistant (PDA), a standard mobile telephone, a tablet personal computer (PC), and/or so forth. The communication device 140 includes a memory 142, a processor 144, and a communication interface 150. The memory 142 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 142 can store instructions to cause the processor 144 to execute modules, processes and/or functions associated with the communication device 140 and/or the beacon communication system 100. The processor 144 can be a general purpose processor, a Field Programmable Gate Array (FPGA), an Application Specific Integrated Circuit (ASIC), a Digital Signal Processor (DSP), and/or the like. The processor 144 can run and/or execute applications, modules, processes and/or functions associated with the communication device 140 and/or the beacon communication system 100.

A user application 146 comprises one of the modules stored within the memory 142 and executed by the processor 144. The user application 146 can be received via the network 110 from the enterprise server 160. Alternatively, the user application 146 can be a hardware module. The user application 146 can cause the processor 144 to execute sub-modules, processes and/or functions associated with, electronic device 120, the communication device 140, the enterpriser server 160, and the beacon communication system 100. For example, in some instances, the user application 146 can process the information contained within beaconing signals that are received from the electronic device 120. In other instances, the user application 146 can send information pertaining to the beaconing signal to the enterpriser server 160 such as, for example, the strength of the beaconing signal, an electronic device 120 identifier, the global position system (GPS) co-ordinates of the electronic device 120, and/or the like. In yet other instances, the user application 146 can process the information contained within analysis signals received from the enterprise server 160 such as, for example, the current status of the electronic device 120, communication options with the owner of the electronic device 120, the current location of the electronic device 120, and/or the like.

The communication device 140 includes a communication interface 150, which can provide communication interfaces with other communication devices, the enterprise server 160, etc. The communication interface 150 can include one or multiple wireless port(s) and/or wired ports. The wireless port(s) in the communication interface 150 can send and/or receive data units (e.g., data packets) via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol), 4G long term evolution (4G LTE) protocol), and/or the like. In some instances, the wired port(s) in the communication interface 150 can also send and/or receive data units via implementing a wired connection between the compute device 140 and the enterprise server 160. In such instances, the wired connections can be, for example, twisted-pair electrical signaling via electrical cables, fiber-optic signaling via fiber-optic cables, and/or the like.

The enterprise server 160 can be, for example, a web server, an application server, a proxy server, a telnet server, a file transfer protocol (FTP) server, a mail server, a list server, a collaboration server and/or the like. The enterprise server 160 includes a memory 162, a processor 164 and a communication interface 170. The memory 162 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 162 can store instructions to cause the processor 164 to execute modules, processes and/or functions associated with the enterprise server 160 and/or the beacon communication system 100. The processor 164 can be a general purpose processor, a Field Programmable Gate Array (FPGA), an Application Specific Integrated Circuit (ASIC), a Digital Signal Processor (DSP), and/or the like. The processor 164 can run and/or execute applications, modules, processes and/or functions associated with the enterprise server 160 and/or the beacon communication system 100.

The memory 162 includes an application distribution module 166 and an application module 168. In one embodiment the application distribution module 166 is executed by the processor 164 and functions to send user application files (e.g., executable files) to different communication devices 140 associated with users (e.g., a father, a stay-home mother, a company employee, etc.) that are authenticated and registered customers of the enterprise. The application distribution module 166 can send the user application files as, for example, as executable file(s), via the network 110 to the communication device 140 that is registered with a valid user. Such an executable file(s) can then be installed by the processor 144 of the communication device 140. In alternate implementations the application distribution module 166 may comprise a dedicated hardware module.

The application module 168 may be executed by processor 164 and functions to provide application data to user applications 146 installed on the different (registered) communication devices 140 via the network 110. For example, in some instances, the application data provided by the application module 168 can include the current status of the electronic device 120, data representing in real-time the communication protocols available to the electronic device 120, instructions associated with status symbols to be displayed on the graphic user interface (GUI) of the user application 146, data associated with the electrical device 120 to be displayed on the GUI of the user application 146 (e.g., the name of the subject, a photograph of the subject etc.), and any other information associated with the status of the electronic device 120 (e.g., time the electronic device 120 provided a set of GPS co-ordinates, etc.), information to allow the user of the communication device 140 to contact the owner of the electronic device (e.g., beacon) 120. In some embodiments, the application module 168 can be located in a third party server distinct from the entity (e.g., company) with which the enterprise server 160 is associated.

The enterprise server 160 includes a communication interface 170, which can provide communication interfaces with for example, the electronic device 120, communication devices 140 and/or other such devices via the communications network 110. The communication interface 170 can include one or multiple wireless port(s) and/or wired ports. The wireless port(s) in the communication interface 170 can send and/or receive data units (e.g., data packets) via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol), 4G long term evolution (4G LTE) protocol), and/or the like. In some instances, the wired port(s) in the communication interface 170 can also send and/or receive data units via implementing a wired connection with the communication device 140. In such instances, the wired connections can be, for example, twisted-pair electrical signaling via electrical cables, fiber-optic signaling via fiber-optic cables, and/or the like.

Figure 2A:
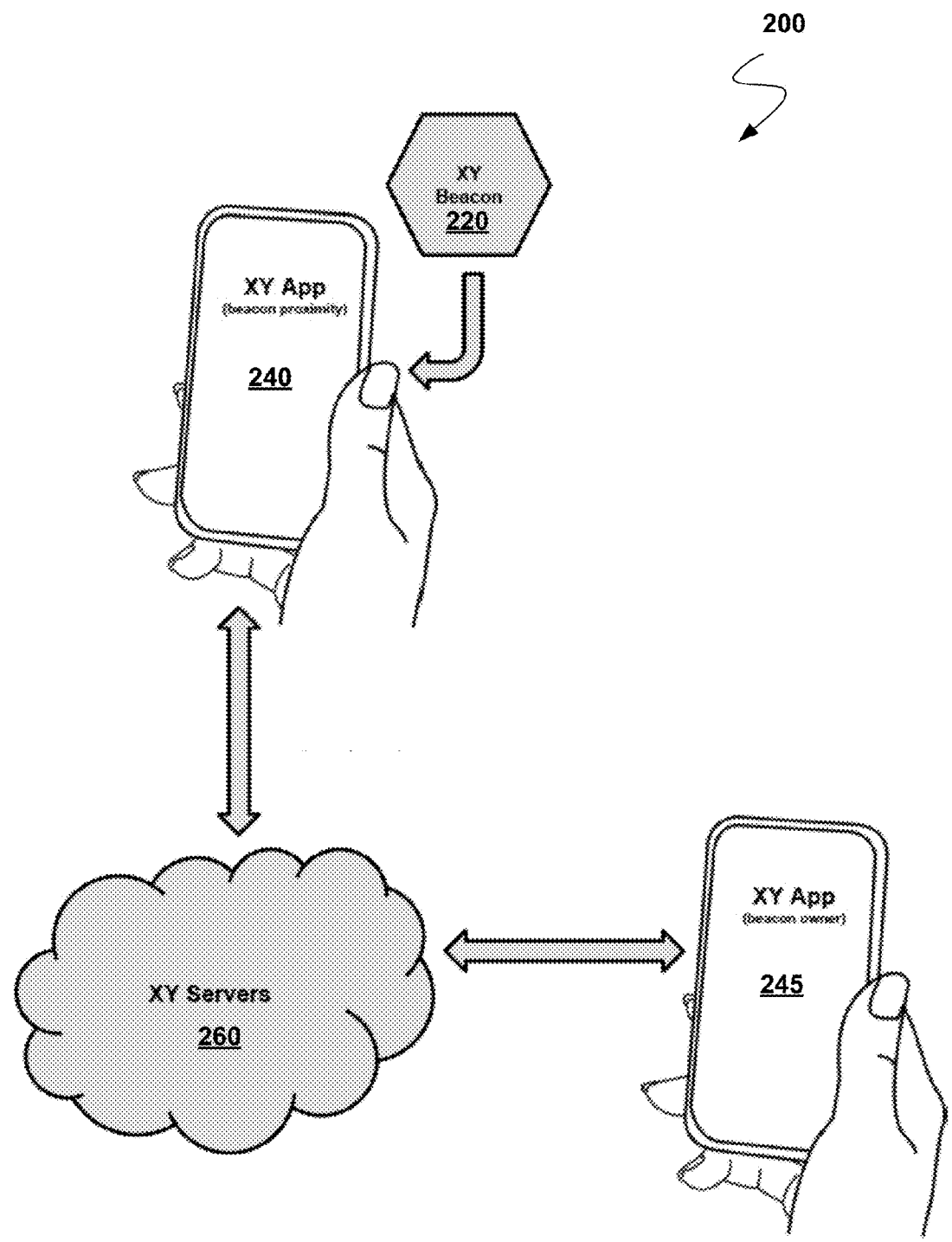
FIG. 2A is a schematic illustration of a beacon communication system according to an embodiment.
Figure 2B:
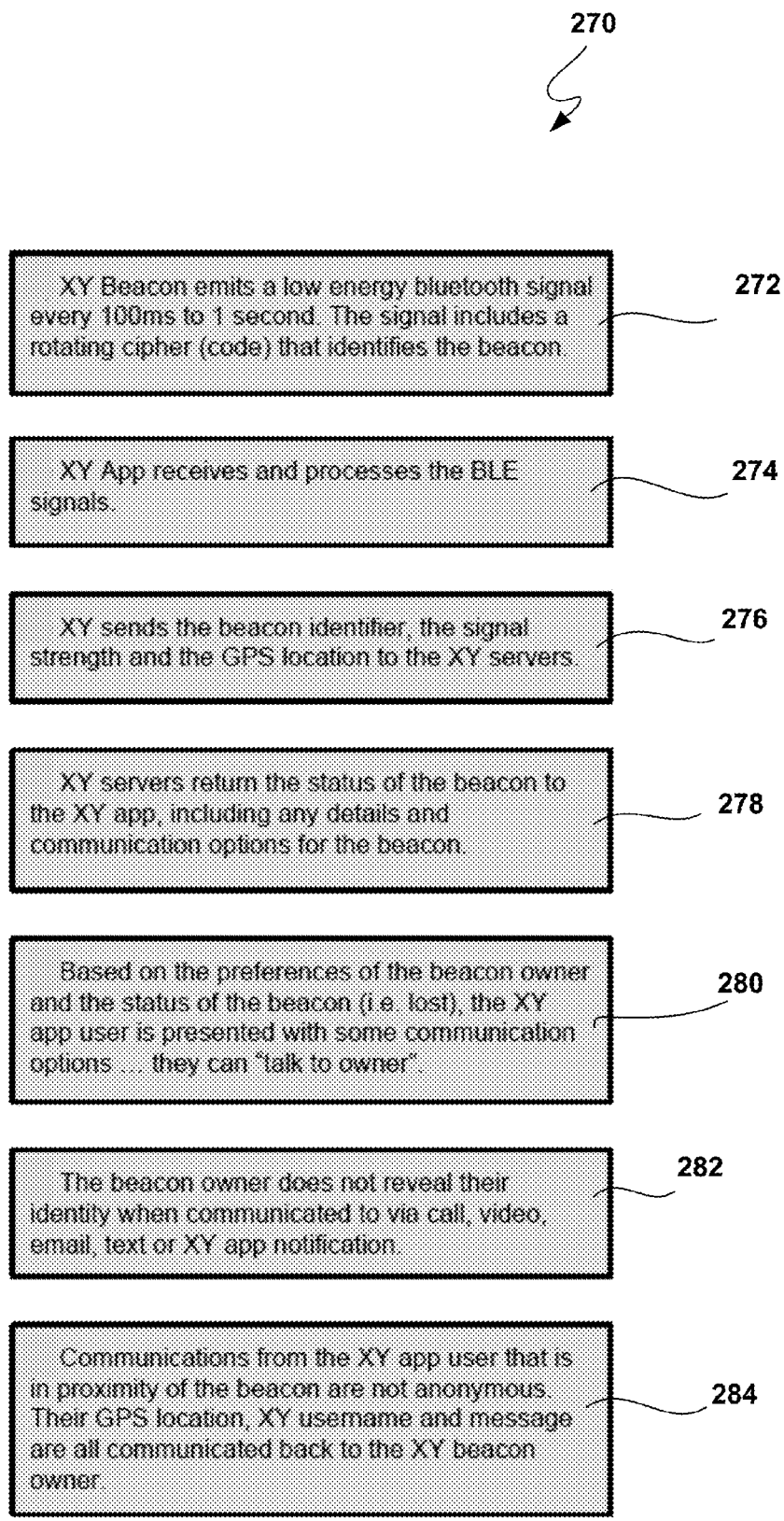
FIG. 2B is a flowchart method for providing communications based on a beacon signal of an electronic beacon device, according to an embodiment.

FIGS. 2A and 2B illustrate a system and method for detecting the location of an electronic device (e.g., beacon) and then providing a communication with the owner of the beacon, according to an embodiment. As shown in FIG. 2A, a beacon communication system 200 can include a server or servers 260, one or more communication devices 240, one or more communications devices 245, and one or more electronic devices or beacons 220 (also referred to as XY Beacon). The electronic device 220, communication devices 240 and 245, and servers 260 can be in communication with one another via a communications network (e.g., communications network 110) and can be configured the same as or similar to the electronic device 120, communication device 140 and server 160, respectively, described above. For example, the XY beacon 220 can emit a beaconing signal (e.g., a low energy Bluetooth® signal), continuously, periodically or substantially periodically (e.g., every 100 ms to 1 sec). The communications device 240 can include a user application (e.g., XY App) downloaded or otherwise provided by the server 260, as described above with respect to FIG. 1. The communication device 245 can be a communications device of the owner of the electronic device 220 and can also include the XY application.

The XY application can be similar to the user application 146 described in relation to FIG. 1 and the XY application can be installed and executed on any (mobile) communication device such as, for example, a laptop computer, a personal digital assistant (PDA), a standard mobile telephone, a tablet personal computer (PC), and/or so forth. As described above, the XY beacon 220 can be similar to the electronic device 120 and include a beaconing module (not shown) similar to beaconing module 126 described in FIG. 1. The electronic device 220 (i.e., XY beacon) can be located within or physically coupled to an object or article to be worn by a pet or person (e.g., a bracelet or necklace, or a dog tag), or physically coupled to an item of interest (e.g., a watch, wallet, credit card, cell phone, etc.), as described above. Such an object or article can be, for example, a necklace or bracelet As shown in FIG. 2B, a method of using the communications system 200 includes emitting from the XY beacon 120 a beaconing signal (e.g., a low energy Bluetooth® signal) periodically or substantially periodically (e.g., every 100 ms to 1 sec) to the XY application, at step 272. Typical ranges for Bluetooth® signals are approximately 50 meters, thus, the XY application can receive the beaconing signal from the XY beacon when the XY application is in close proximity to the XY beacon 220.

In step 274, the XY application on the communication device 240 receives and processes the beaconing signal. As described above, the XY application receives the beaconing signal via a communication interface similar to the communication interface 150 described in FIG. 1. Furthermore, the XY application can process the beaconing signal to extract information such as, for example, a XY beacon identifier, the beaconing signal strength, and/or the GPS information included in the beaconing signal.

In step 276, the XY application can send the relevant XY beacon information to the XY servers 260. As described above, the XY application can send the relevant beaconing information to the XY servers 260, for example, via Wi-Fi®, or a cellular protocol (e.g., 3G, 4G, 4G LTE).

In step 278, the XY servers 260 return the status of the XY beacon to the XY application that can include information associated with one or more modes of communication between the XY application and the communication device 245 associated with the owner of the XY beacon 220. The status of the XY beacon can include, for example, a "lost" status, a "not lost" status, a "contact owner" status, an "owner last seen at a specific location" status, a "share with group" status, and/or the like.

In step 280, the XY application can present to the communications device 240 one or more options for communicating with the owner of the XY beacon 220 based on the preferences set by the XY beacon owner and the current status of the XY beacon 220. For example, the communications options can include telephone, video, text, or an XP application notification.

In steps 282 and 284, the user of communication device 240 can contact the owner of the XY beacon via one of the communications options provided. During such communication, the identity of the owner can remain anonymous. In other words, the owner of the XY beacon can be notified that someone has found the owner's lost subject (e.g., person, pet, or item) via the XY application rather than receiving a message from an unknown caller. For example, the "telephone" or "video" communication option could involve the user of the communications device 240 recording, via the XY application, a voice or video message for the XY beacon owner. This voice or video message would then be sent by the communications device 240 to the XY servers 260 and thereby made accessible to the beacon owner. Alternatively, a user of the communication device 240 could input, via the XY application, a message that would be provided, via the XY servers 260, to the communication device 245 of the beacon owner as a text message or as a notification associated with the XY app on the communication device 245.

With such communication, the identity of the user communication device 240 is typically not anonymous. For example, the GPS location of the user communication device 240, the user's username associated with the XY application, and the message sent by the user are generally all communicated to the owner of the XY beacon.

Figure 3A:
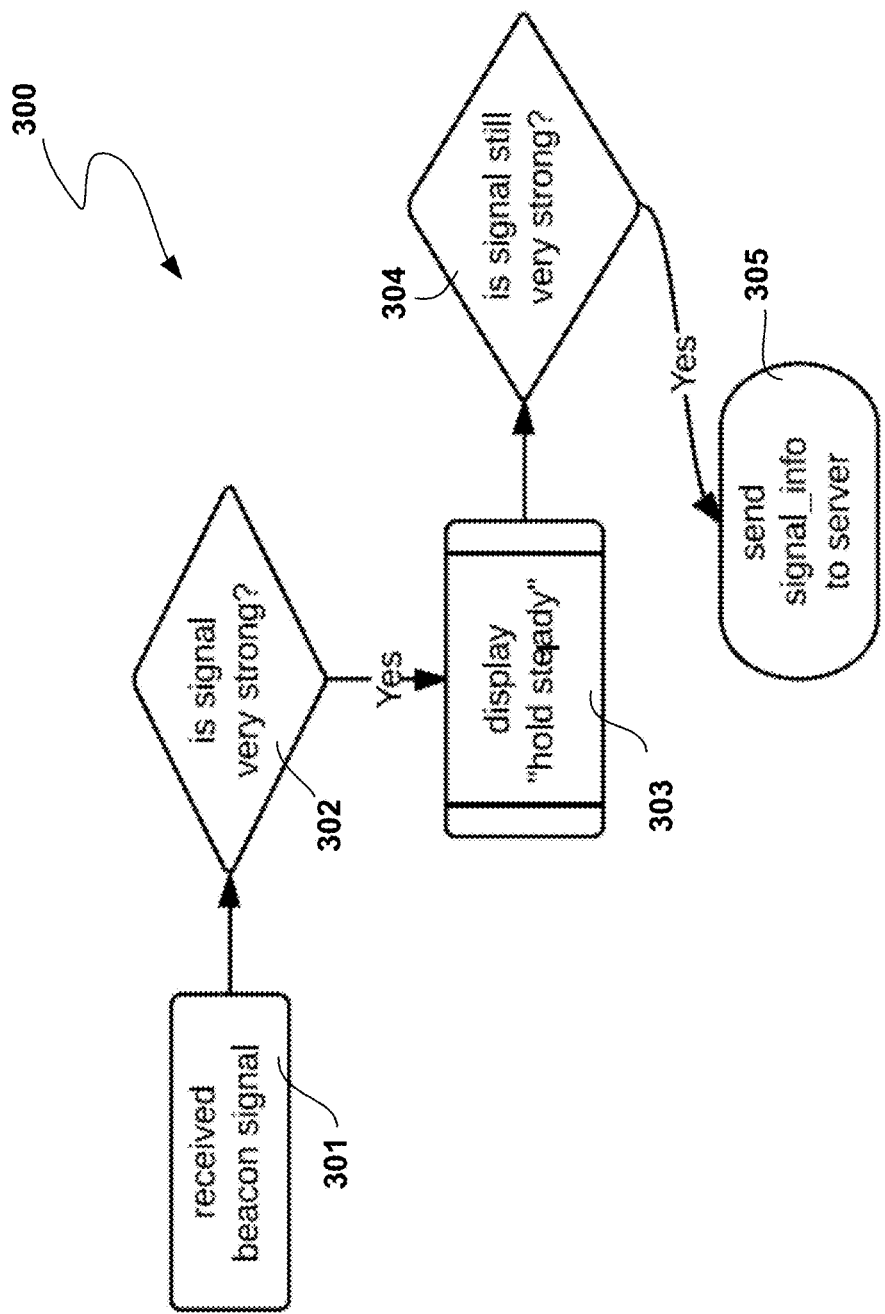
FIGS. 3A and 3B collectively provide a flowchart illustrating a method of receiving a beacon signal and providing a communication based on the beacon signal, according to an embodiment.
Figure 3B:
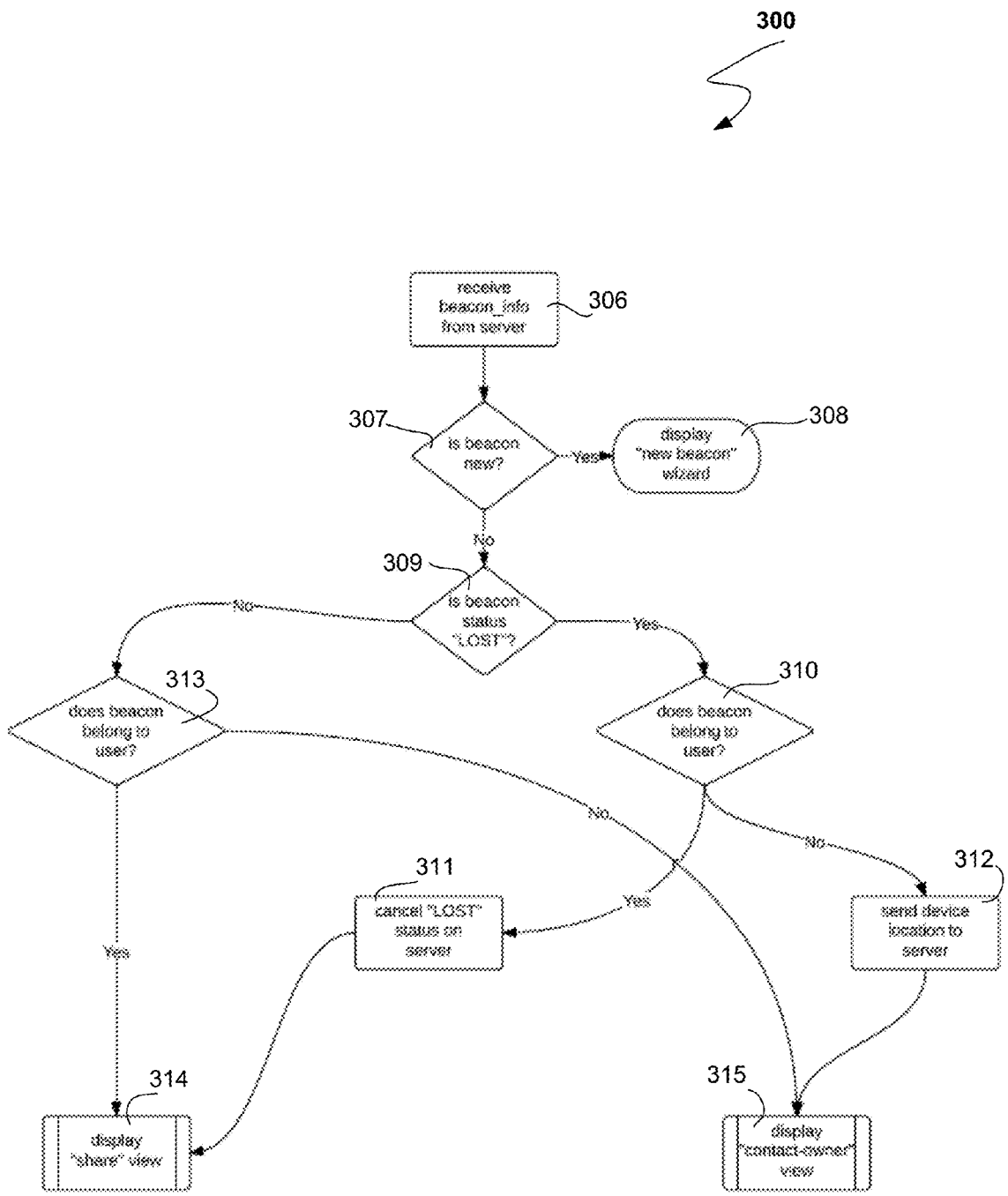

FIGS. 3A and 3B collectively provide a flow chart illustrating a method for receiving a beacon signal at a communication device (e.g., 140, 240) from an electronic device (i.e., beacon) (e.g., 120, 220) and related analyses associated with the signal by the server (e.g., 160, 260), according to an embodiment. The method includes receiving a beaconing signal at, for example, a user application that is installed on a mobile communication device (e.g., 140, 240), in step 301. As described above, the beaconing signal can be sent by, for example, an electronic device (e.g., 120, 220) with beaconing capability that can be attached to a person or pet (via an object worn by the person or pet) and/or an item of interest (e.g., watch, wallet, cell phone, etc.). The beaconing signal can contain information such as, for example, identifiers associated with the electronic device and/or identifiers associated with the owner(s) of the electronic device.

In step 302, the user application on the communication device makes a determination whether the beaconing signal strength is strong. For example, the determination can be made by examining the beaconing signal amplitude (after noise removal steps) against a pre-determined amplitude range set for the specific environmental conditions in the region of the communication device and/or electronic device.

In step 303, if the beaconing signal strength is determined to be sufficiently strong, a "hold steady" message can be displayed, for example, on the GUI of the user communication device.

In step 304, another determination is made by, for example, the user application on the user communication device to ascertain if the beaconing signal strength is sufficiently strong after the passage of a pre-determined time period. For example, this maybe desirable because, beaconing signals are typically low magnitude signals and can loose signal strength very rapidly for a number of reasons such as, for example, if the electronic device sending the beaconing signal is moving rapidly away from the effective Bluetooth® range.

In step 305, if the determination is made that the beaconing signal is sufficiently strong after the passage of the pre-determined time period, the beaconing signal can be analyzed and information contained within the beaconing signal can be sent to, for example, an enterprise server (e.g., 160, 260).

In step 306 (see FIG. 3B), signals can be received at the user communication device that include information associated with the electronic device (e.g., 120, 220). As described above, the signals can be sent by, for example, an enterprise server (e.g., 160, 260). Also as described above, the signals can include information associated with the current status of the electronic device (i.e., beacon), and any other information associated with the mode of communication that can be established between, for example, the user of the communication device and owner of the electronic device (i.e., beacon).

In step 307, a determination is made by the user application on the user communication device to ascertain if the beacon signal information received in step 306 is associated with the a new beacon signal or a beacon signal that has previously been received at the communication device. For example, the determination can be made by matching the electronic device identifiers with previously received identifiers.

If a determination is made that the beacon signal information received in step 306 is new, a signal can be sent to display a "new beacon wizard" message and/or window on, for example, the GUI of the user application, in step 308. In such instances, the new beacon wizard can perform a process of pairing between the electronic device (i.e., beacon) and the communication device. After the pairing is complete, the process can move to step 309.

If, however, a determination is made that the beacon signal information received in step 306 is not new (i.e., the communication device has previously received the beacon signal from that electronic device), a new determination is made to ascertain whether the current status of, for example, the electronic device is "lost", in step 309. Such a determination can be made, for example, by analyzing the contents of the signal sent by the enterprise server (e.g., the current status of the beaconing electronic device).

If the determination is made that the current status of the electronic device is "lost" as shown in step 309, a determination is made to ascertain whether the electronic device generating the beaconing signal is related to the user of the communication device, in step 310. Such a determination can be made at, for example, the user application by accessing database records that can relate identifiers of the user of the communication device with that of identifiers of owners of the electronic device.

Figure 4B:
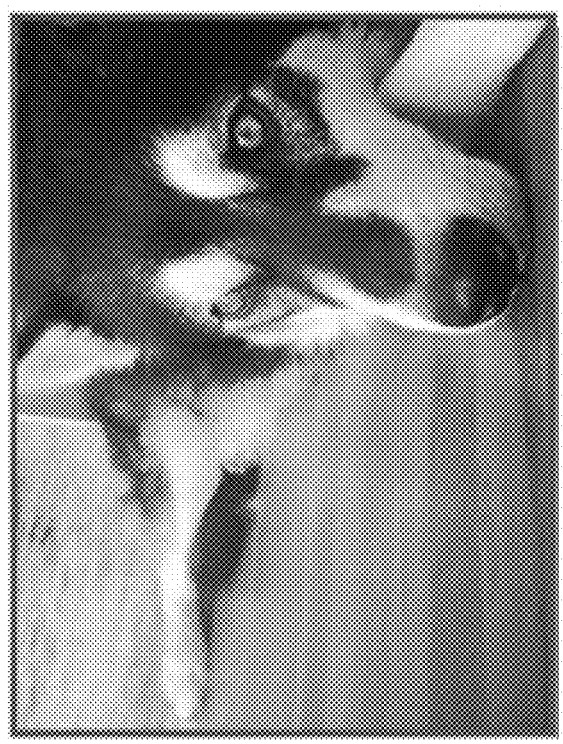
FIGS. 4A and 4B are each an example screenshot of a graphical user interface (GUI) of a user application that provides information associated with a beacon signal, according to an embodiment.
Figure 4B:
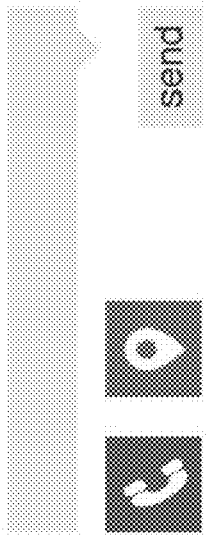
Figure 4A:
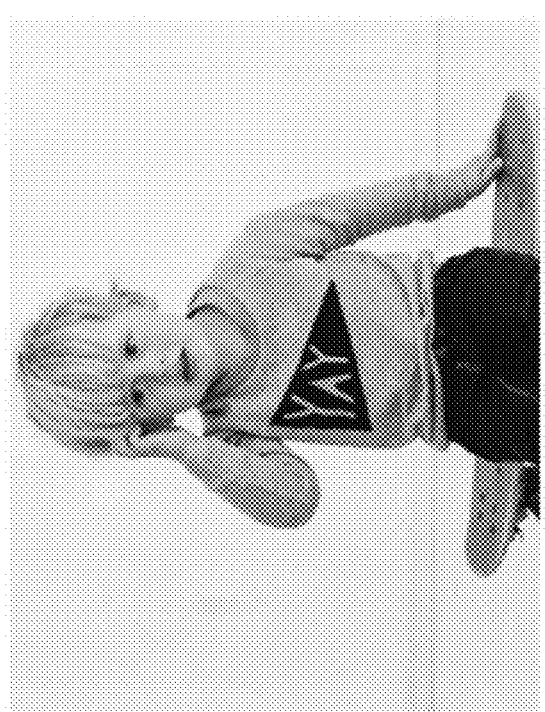
Figure 4A:
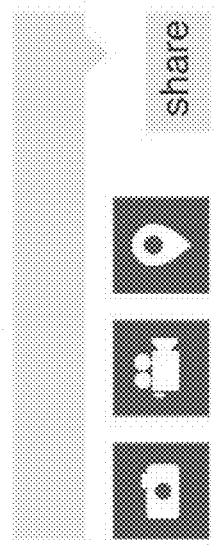

If the determination is made that the owner of the electronic device generating the beaconing signal is related to or is the same as the user of the communication device, a message can be sent to, for example, the enterprise server to cancel the "lost" status associated with the electronic device in the enterprise server, in step 311. In such a case, the user of the communication device is in sufficiently close geographical proximity to the electronic device, and therefore, the item or subject to which the electronic device is attached to is not lost. This can be followed by step 314, where a message can be sent to, for example, the GUI of the interface user application to "share view". An example screenshot illustrating the type of information that may be displayed is shown in FIG. 4A.

If the determination is made in step 310 that the owner of the electronic device generating the beaconing signal is not the same as the user of the communication device, the communication device geographical location (e.g., GPS co-ordinates) is sent to the enterprise server, in step 312. The enterprise server can then identify the owner of the electronic device (i.e., beacon) and provide a contact owner display on the user application GUI on the communication device, at step 315. For example, an example screenshot of such a contact owner display is shown in FIG. 4B.

If, at step 309 a determination is made that the current status of the electronic device is "not lost", a determination is made to ascertain whether the user of the communication device is the owner of the electronic device generating the beaconing signal at step 313. Such a determination can be made by the user application by accessing database records that can relate identifiers of the user of the communication device with that of identifiers of owners of the electronic device.

If it is determined at step 313 that the owner of the electronic device generating the beaconing signal is the user of the communication device, in step 314, a message is sent to, for example, the GUI of the user application to "share view" as described above.

If it is determined in step 313 that the owner of the electronic device generating the beaconing signal is not the user of the communication device, in step 315, a "contact owner" message can be displayed on the user application GUI as described above.

As mentioned above, FIG. 4A is a screenshot of the graphic user interface (GUI) of a user application that shows an example screen that can be displayed when the user of a communication device that receives a beacon signal from an electronic device is also the owner of the electronic device. The screen includes information such as, for example, a photograph of a person, a pet, an object, etc. Additionally, the screen can also display, for example, information associated with contact information for the owner such as their name, the current status of the electronic device, (e.g., "lost" or "not lost"), and any messages indicating an action item to be undertaken by a user or owner ("share with group").

FIG. 4B is a screenshot of the graphic user interface (GUI) of a user application that shows a screen that can be displayed when the beaconing electronic device is not owned by the user of the communication device. Thus, the item (or person or pet) to which the electronic device is coupled, is likely lost. The screen can display, for example, a photograph of a person, a pet, an object, etc. Additionally, the screen can also display information associated with contacting the owner of the electronic device, such as a telephone number, text, video, email, etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors.

What is claimed is:

1. A method for beacon-based communication, comprising:
   detecting, at a communication device, a beaconing signal generated by an electronic beacon device wherein the beaconing signal is associated with an entity affiliated with the electronic beacon device;
   transmitting, from the communication device, identification information inherent within the beaconing signal;
   receiving, at the communication device, one or more communication options through which the entity may be contacted wherein the communication options do not identify the entity, thereby enabling the entity to remain anonymous to a user of the communication device;
   receiving, through a user interface of the communication device, user input provided by the user of the communication device wherein the user input is in accordance with at least one of the communication options; and
   transmitting, from the communication device, message information for the entity wherein the message information is based upon the user input.

2. The method of claim 1 wherein the entity is an owner of the electronic beacon device and wherein the electronic beacon device is coupled to an article of interest to the owner.

3. The method of claim 1 wherein the transmitting includes transmitting the identification information to a server remote from the communication device and the receiving includes receiving the one or more communication options from the server.

4. The method of claim 1 further including extracting a rotating cipher from the beaconing signal wherein the rotating cipher corresponds to the identification information and identifies the electronic beacon device.

5. The method of claim 1 further including transmitting, from the communication device, location information wherein the location information includes position information relating to a location of the communication device and a signal strength of the beacon signal.

6. The method of claim 5 wherein the position information includes GPS coordinates.

7. The method of claim 1 further including receiving, at the communications device, status information relating to the electronic beacon device.

8. The method of claim 1 wherein the communication options include at least one of voice message, text message and video message.

9. A communication device for facilitating beacon-based communication, the communication device comprising:
   a processor;
   a user interface;
   a communication interface in communication with the processor;
   memory coupled to the processor, the memory including instructions which, when executed by the processor, cause the processor to:
      detect a beaconing signal generated by the electronic beacon device wherein the beaconing signal is associated with an entity affiliated with the electronic beacon device;

transmit identification information inherent within the beaconing signal;

receive one or more communication options through which the entity may be contacted wherein the communication options do not identify the entity, thereby enabling the entity to remain anonymous to a user of the communication device;

receive, through the user interface configured to present at least one of the one or more communication options, user input provided by the user of the communication device wherein the user input is in accordance with the at least one of the of the one or more communication options; and transmit message information for the entity wherein the message information is based upon the user input.

10. The communication device of claim 9 wherein the entity is an owner of the electronic beacon device and wherein the electronic beacon device is coupled to an article of interest to the owner.

11. The communication device of claim 9 wherein the instructions further include instructions which cause the processor to transmit the identification information to a server remote from the communication device and to receive the communication options from the server.

12. The communication device of claim 9 wherein the instructions further include instructions which cause the processor to extract a rotating cipher from the beaconing signal wherein the rotating cipher corresponds to the identification information and identifies the electronic beacon device.

13. The communication device of claim 9 wherein the instructions further include instructions which cause the processor to transmit location information wherein the location information includes position information relating to a location of the communication device and a signal strength of the beacon signal.

14. The communication device of claim 13 wherein the position information includes GPS coordinates.

15. The communication device of claim 9 wherein the instructions further include instructions which cause the processor to receive status information relating to the electronic beacon device.

16. A system for facilitating beacon-based communication, the system comprising:
a processor;
a network interface in communication with the processor;
memory coupled to the processor, the memory including an application module and status information relating to an electronic beacon device, wherein when executed by the processor the application module causes the processor to:
receive, from a communication device which has detected a beaconing signal transmitted by an electronic device in proximity of the communication device, identification information inherent within the beaconing signal wherein the beaconing signal is associated with an entity affiliated with the electronic beacon device;
transmit, to the communication device, the status information relating to the electronic beacon device and one or more communication options through which the entity may be contacted;
receive, from the communication device, message information comporting with at least one of the one or more communication options wherein the message information is based upon user input provided by a user of the communication device; and
send the message information to another communication device associated with the entity.

17. The system of claim 16 wherein the entity is an owner of the electronic beacon device and wherein the electronic beacon device is coupled to an article of interest to the owner.

18. The system of claim 16 wherein the application module further causes the processor to receive, from the communication device, location information including position information relating to a location of the communication device and a strength of the beacon signal.

19. A method for beacon-based communication, comprising:
detecting, at a communication device, a beaconing signal generated by an electronic beacon device wherein the beaconing signal is associated with an entity affiliated with the electronic beacon device;
transmitting, from the communication device, identification information inherent within the beaconing signal;
receiving, at the communication device, one or more communication options through which the entity may be contacted;
receiving, through a user interface of the communication device, user input provided by the user of the communication device wherein the user input is in accordance with at least one of the communication options; and
transmitting, from the communication device, message information for the entity wherein the message information is based upon the user input.

\* \* \* \* \*